United States Patent [19]

Bagby et al.

[11] 4,145,126
[45] Mar. 20, 1979

[54] FILM CASSETTE SENSING AND RETAINING UNIT

[75] Inventors: John P. Bagby, Lake Forest; Kenyon A. Hapke, Libertyville; Thomas R. Wells, Des Plaines, all of Ill.

[73] Assignee: Polaroid Corporation, Cambridge, Mass.

[21] Appl. No.: 374,282

[22] Filed: Jun. 28, 1973

[51] Int. Cl.² ............................................. G03B 23/02
[52] U.S. Cl. ........................................ 352/74; 352/72; 352/130
[58] Field of Search ............... 352/72, 74, 78 R, 78 C, 352/104, 130; 354/77, 78, 88

[56] References Cited

U.S. PATENT DOCUMENTS 3,809,464   5/1974   Bennett .................................. 352/74
3,892,477   7/1975   Land ..................................... 352/74

Primary Examiner—L. T. Hix
Assistant Examiner—Alan Mathews
Attorney, Agent, or Firm—David R. Thornton

[57] ABSTRACT

A film cassette sensing and retaining unit for film handling apparatus. The unit is responsive to completed insertion of a cassette into the film handling apparatus to mechanically latch the cassette in position and to electrically condition and actuate the film handling apparatus. Upon termination of operation of the film handling apparatus, the unit is effective to unlatch and eject the cassette and thereby deactuate the film handling apparatus. A disabling mechanism is provided to prevent premature unlatching and ejection of the cassette in a particular circumstance.

7 Claims, 6 Drawing Figures

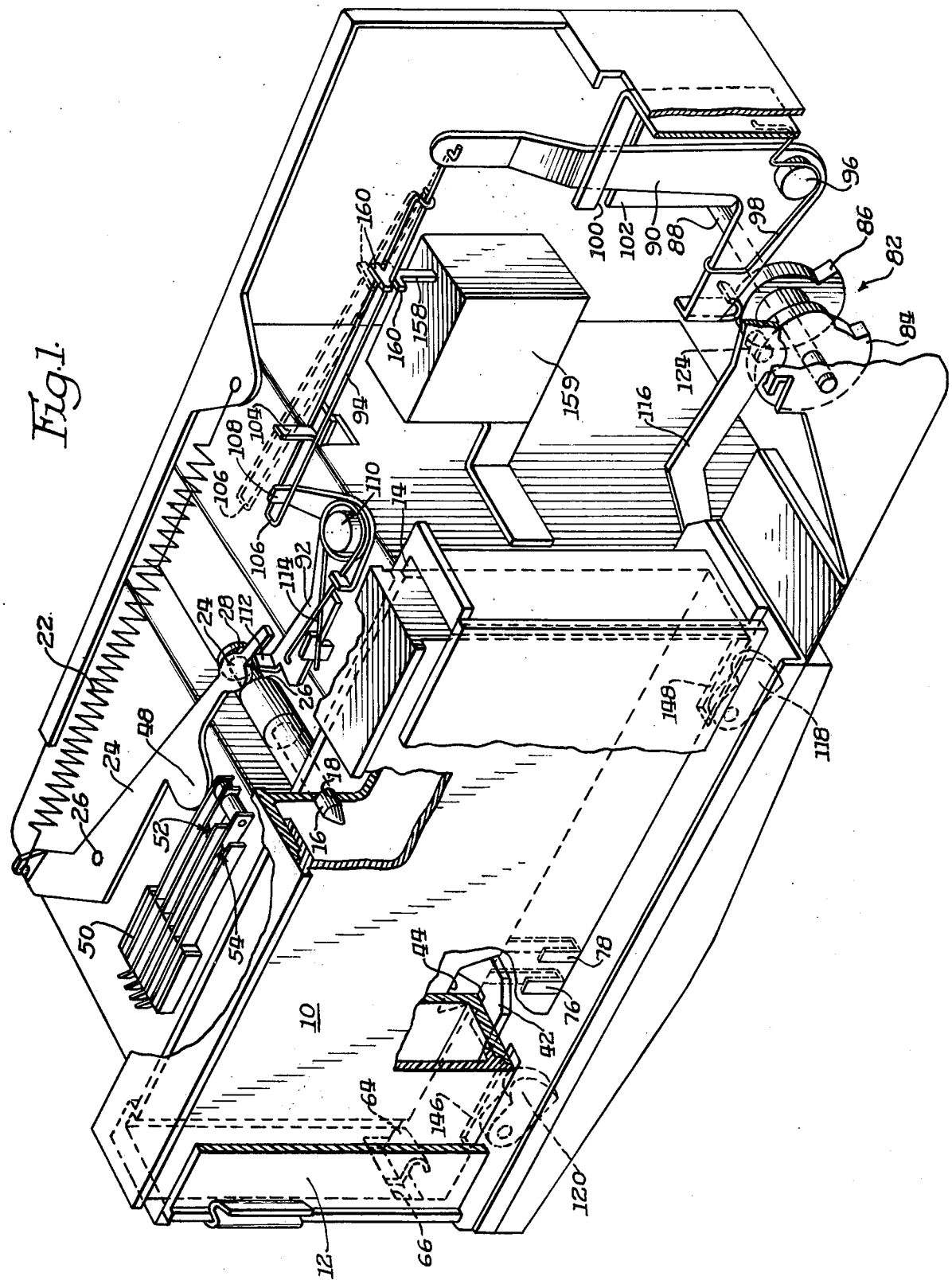

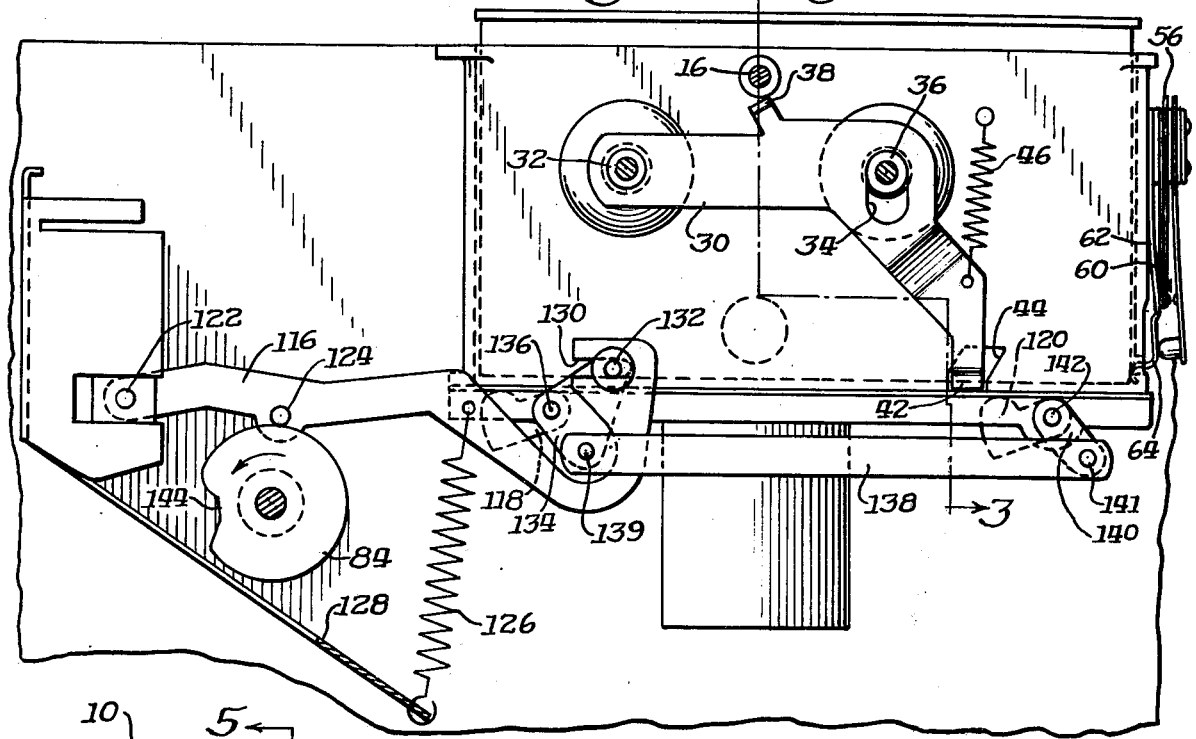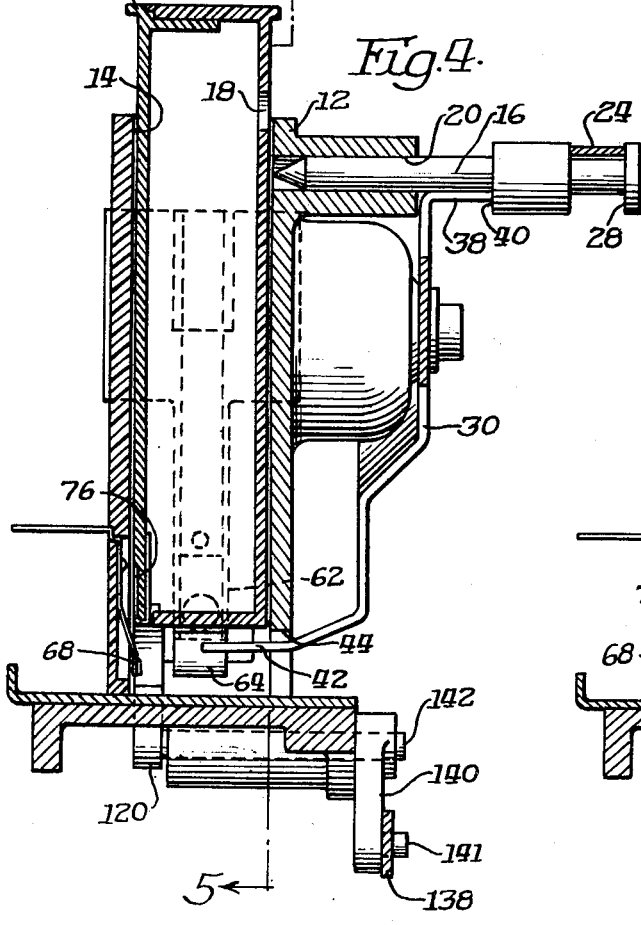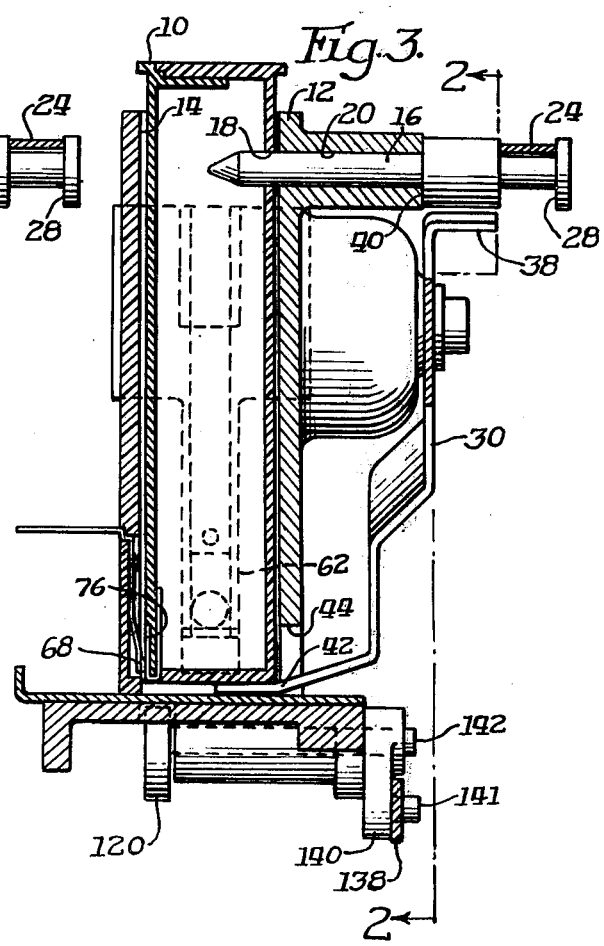

FILM CASSETTE SENSING AND RETAINING UNIT

This invention relates to film handling apparatus and, in particular, to a film cassette sensing and retaining unit for film handling apparatus.

Recent technological advances have made possible a rapid-process cassette system of motion picture photography which permits the photographer himself to expose, process, and project a length of motion picture film, all without removing the film from the cassette. Rapid-process film cassettes of the type referred to are described, for example, in U.S. Pat. No. 3,608,455.

In the rapid-process cassette system, the film cassette is internally provided with processing means comprising a supply of development fluid contained in a rupturable container or pod and an applicator for applying the development fluid to the film emulsion. During exposure in a camera adapted to receive the cassette, the film is advanced from the cassette supply reel to the cassette take-up reel. To process the exposed film, the cassette is removed from the camera and inserted into a processor/projector unit. The development fluid pod in the cassette is ruptured, and a drive system is actuated to transport the exposed film from the take-up reel back to the supply reel. As the film is transported to the supply reel, the applicator within the cassette deposits a coating of the development fluid on the film emulsion surface to effect rapid processing of the film. The film may then be projected by actuating a projection drive shuttle to advance the film from the supply reel to the take-up reel. Following projection, the film may be rewound onto the supply reel and conveniently stored in the cassette in readiness for subsequent viewing.

The processor/projector unit in a rapid-process cassette system of the type referred to will be called upon to perform plural operations and functions and is preferably provided with a control system capable of programming and actuating several operating modes of the processor/projector unit. Such a control system is described in the application of Erwin E. Figge et al, entitled Film Handling Apparatus Control System, filed concurrently herewith and assigned to the same assignee.

It is the principal object of the present invention to provide a cassette sensing and retaining unit for a film handling apparatus such as the processor/projector unit referred to above.

It is a specific object of the present invention to provide a cassette sensing and retaining unit which is responsive to insertion of a film cassette into a film handling apparatus, to mechanically latch the cassette in position, to electrically condition and actuate the film handling apparatus, and, upon termination of operation of the film handling apparatus, to unlatch and eject the cassette thereby de-actuating the film handling apparatus.

It is a further object of the present invention to provide a cassette sensing and retaining unit for a film handling apparatus which includes a selectively actuatable disabling mechanism which, when actuated, is effective to prevent unlatching and ejection of the cassette. For example, in the operation of the processor/projector unit in a rapid-process cassette system, it has been found desirable to proceed with mandatory projection of the film following development of the film in order to insure proper drying of the film. By actuating the disabling mechanism, the sensing and retaining unit may be precluded from unlatching and ejecting the cassette so that the apparatus will be permitted to proceed to its "project" mode of operation following the "develop" mode. The disabling mechanism is rendered effective in response to a suitable film condition indicating means on the cassette which indicates whether the cassette contains a processed or unprocessed film.

The foregoing and other features and objects of the present invention will be better understood by reference to the following detailed description taken in conjunction with the accompanying drawings.

In the drawings:

FIG. 1 is an isometric view of a preferred form of film cassette sensing and retaining unit according to the present invention.

FIG. 2 is a cross-sectional view of the film cassette sensing and retaining unit of FIG. 1 taken at 2—2 of FIG. 3.

FIG. 3 is a cross-sectional view taken at 3—3 of FIG. 2.

FIG. 4 is a cross-sectional view similar to FIG. 3 but illustrating the latching pin retracted and the ejectors in eject position.

Figure 5:
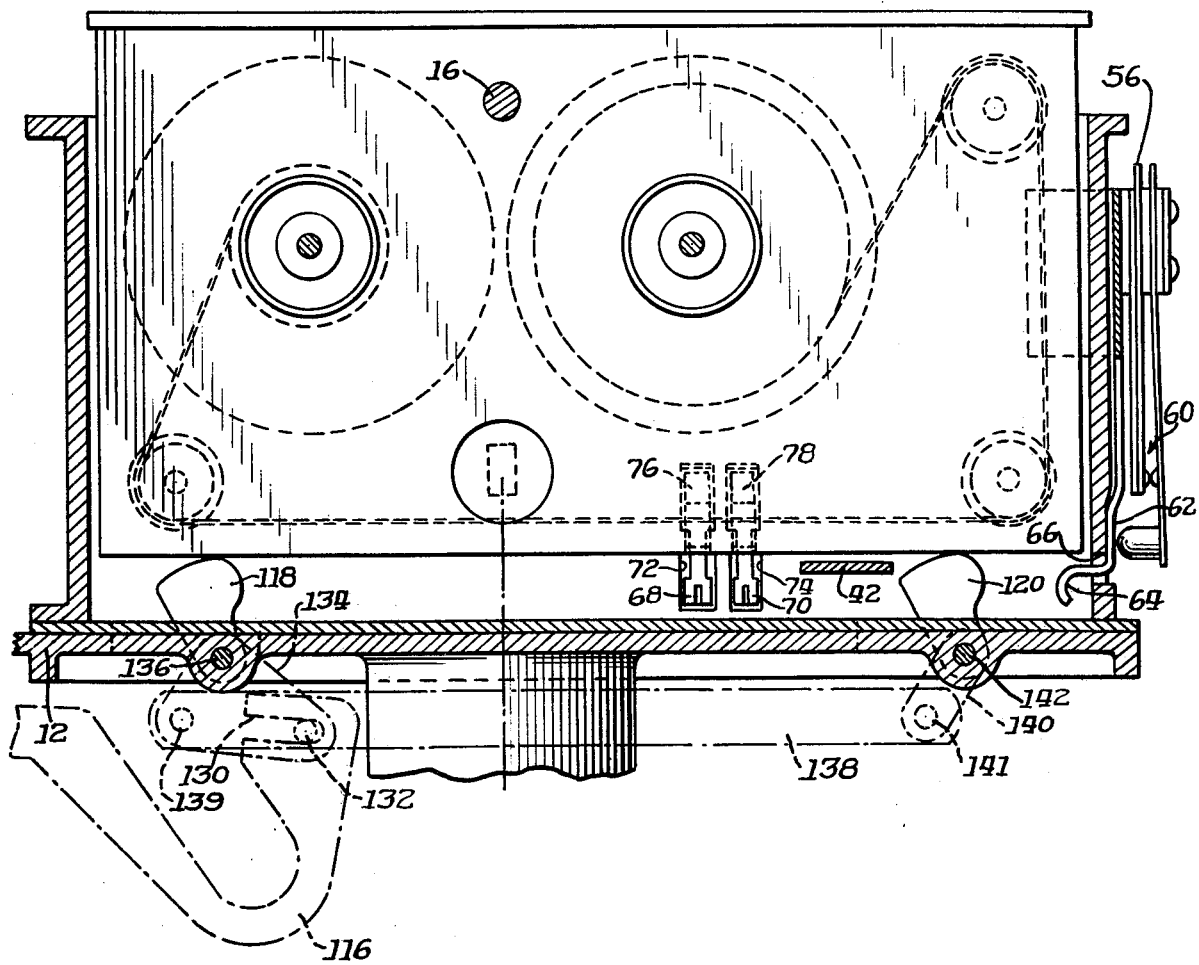
FIG. 5 is a cross-sectional view taken at 5—5 of FIG. 4.

Referring first to FIG. 1 of the drawings, the cassette sensing and retaining unit is illustrated as used, for example, in a processor/projector unit. A film cassette 10 is shown received within a cassette receiving slot 14 which is formed by a housing 12 appropriately mounted in processor/projector unit. The cassette 10 is latched in position by a latching pin 16 which has entered a complementary latching aperture 18 located in one wall of the cassette 10.

The latching pin 16 is slidably carried in a bore 20 formed in the housing 12 perpendicular to the slot 14 as further illustrated in FIGS. 3 and 4. The latching pin 16 is normally urged toward the slot 14 by a tension spring 22 acting through a lever 24 which is mounted for pivotal movement about a pivot pin 26. One end of the lever 24 is secured to the tension spring 22, and the opposite end is trapped within a circumferential groove 28 provided in the rearward end of the latching pin 16.

Prior to insertion of a cassette, the latching pin 16 is held in the retracted or cocked position illustrated in FIG. 4 by a trigger member 30. As best illustrated in FIG. 2, the trigger member 30 is mounted for pivotal movement about a cylindrical element 32. A slot 34 is provided in the trigger member 30 and slidably engaged with a second cylindrical element 36. The trigger member 30 includes a retaining finger which is adapted to engage a circumferential shoulder 40 provided on the latching pin in the manner illustrated in FIG. 4. Prior to insertion of a cassette into the slot 14, the retaining finger 38 acts to hold the latching pin in its retracted position against the force developed by the tension spring 22. The trigger member 30 is further provided with a trigger finger 42 which projects into the bottom region of the cassette receiving slot 14 through an opening 44 provided in the housing 12, as illustrated in FIGS. 2 through 4. The trigger member 30 is biased by a tension spring 46 to its cocked position as illustrated in FIG. 4. When a cassette is positioned into the slot 14, its bottom will rest against the trigger finger 42. Pressing the cassette firmly downwardly to fully insert the cassette will serve to depress the trigger finger 42, causing the trigger member 30 to pivot downwardly, disengaging the retaining finger 38 from engagement with the shoulder 40 of the latching pin 16, and thereby enabling the latching pin 16 to enter the latching aperture 18 in the wall of the cassette under the force of the tension spring 22 to latch the cassette in position in the slot 14 as illustrated in FIG. 3.

Figure 6:
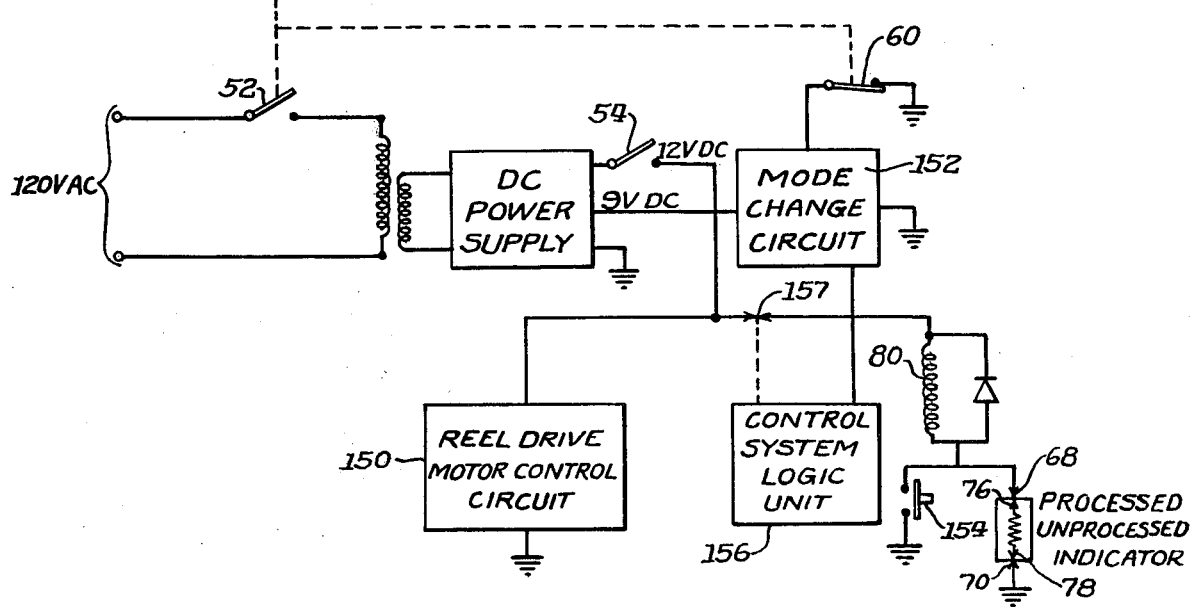
FIG. 6 is a diagrammatic illustration to explain the electrical conditioning and actuation of a film handling apparatus by the film cassette sensing and retaining unit of the present invention.

Referring further to FIG. 1, it should be noted that when the latching pin 16 is advanced into the cassette latching aperture 18, the lever 24 simultaneously acts through a protrusion 48 to actuate a switch assembly 50 mounted on the housing 12. The switch assembly 50 comprises two normally open switches 52 and 54 which is illustrated in FIG. 6 are included in the energization circuitry of the film handling apparatus. As further discussed hereinafter, closure of the switches 52 and 54 by the lever 24 incident to complete insertion of a cassette into the slot 14 serves to electrically energize and actuate the film handling apparatus.

As best depicted in FIGS. 2 and 5, another switch assembly 56 is mounted on the housing 12 adjacent one end of the slot 14. The switch assembly 56 includes a normally-closed switch 60 and a resilient cassette sensing element 62. The sensing element includes a sensing finger 64 which extends into the slot 14 through an opening 66 in the housing 12 (see also FIG. 1). The spring action of the sensing element 62 urges the finger 64 normally into the position illustrated in FIG. 5. However, when a cassette is fully inserted into the slot 14, the sensing finger 64 is displaced outwardly by the wall of the cassette as illustrated in FIG. 2 causing the normally-closed switch 60 to open. As illustrated in FIG. 6, the switch 60 when closed provides a ground return path through the mode change circuit of the control system of the film handling apparatus. As further discussed hereinafter, the function of the switch 60 is to immediately cycle the control system through its operating mode logic back to "off" status should the trigger finger 42 have been improperly actuated by an object other than a cassette. As indicated, when a cassette is inserted into the slot 14, the switch 60 will be maintained open.

In addition to sensing the insertion of a cassette, the sensing and retaining unit of the present invention includes means for sensing the status of a film condition indicator provided on the cassette. As illustrated in FIGS. 3 through 5, a pair of leaf-spring electrical sensor contacts 68 and 70 are mounted on the housing 12 to normally extend through openings 72 and 74, respectively, into the interior of the slot 14. The cassette 10, in turn, is provided with a pair of film-condition indicator contacts 76 and 78 located in complementary manner along the bottom edge of the cassette 10, as best depicted in FIG. 5. When the film with the cassette 10 is an undeveloped film, an electrical continuity exists between the cassette indicator contacts 76 and 78. When the cassette contains a previously developed film, an electrical discontinuity exists between the cassette indicator contacts 76 and 78.

When the cassette 10 is fully inserted into the slot 14, the sensor contacts 68 and 70 bear against the respective indicator contacts 76 and 78 in the manner illustrated in FIG. 3. If an electrical continuity exists between the indicator contacts 76 and 78, a ground return path is completed through a relay coil 80 as illustrated in FIG. 6 and further discussed hereinafter. It should be noted that the particular type of film condition indicator provided on the cassette does not form a part of this invention, and other types of indicators might be used in which case the sensor means provided in the sensor and retaining unit would be adapted as appropriate to respond to the type of indicator provided on the cassette to close a switch or in another manner complete the ground return path through the relay coil 80.

Referring again to FIG. 1, consideration may next be given to the portion of the structure of the sensing and retaining unit which is associated with termination of operation of the film handling apparatus. As illustrated in FIG. 1, a timing cam assembly 82 is provided which comprises an eject control cam 84, a reset control cam 86, and a common cam shaft 88. The rotational position of the cam shaft is determined by the control system of the processor/projector unit in a manner such as described, for example, in the aforementioned application of Erwin E. Figge et al, entitled Film Handling Apparatus Control System.

The reset control cam 86 serves to open the switches 52 and 54 to de-energize the film handling apparatus and to effect a retraction of the latching pin 16 from the cassette latching aperture 18 for engagement and retention of the latching pin 16 in its reset or cocked position illustrated in FIG. 4. More specifically, the reset control cam 86 operates a reset mechanism which comprises a cam follower 90, a reset lever 92, and a connecting link 94 between the cam follower 90 and the reset lever 92. The cam follower 90 is pivotally mounted on a pivot pin 96 and biased to bear at one end against the surface of the reset cam 86 by a bias spring 98. Pivotal motion of the cam follower 90 is guided by a slot 100 in a plate 102 to prevent lateral displacement of the cam follower 90. The connecting link 94 is secured at one end to the cam follower 90. At its opposite end and for a major portion of its length, the connecting link 94 is formed as a loop. A guide post 104 projects through the loop to permit reciprocative longitudinal movement of the link 94 while preventing lateral dislocation of the link 94. It may be noted at this juncture that the guide post 104 also permits an upward angular motion of the link 94 to enable effectuation of a reset disabling feature which will be described hereinafter. The free end 106 of the connecting link loop normally engages in lost motion type of connection a vertically oriented projection 108 provided at one end of the reset lever 92. The reset lever is mounted for pivotal movement about a pivot pin 110 and includes at its opposite end from the projection 108 a reset finger 112 which is adapted to engage against a portion of the lever 24 for returning the latching pin 16 and the lever 24 to their reset positions. A spring 114 lightly biases the reset lever 92 in a counterclockwise direction against the stop-tab 125 to insure the at-rest positions of finger 112 and projection 108. The latching pin lever 24 is retracted by the reset control cam 86 at a predetermined time incident to termination of an operating cycle of the processor/projector unit. Specifically, the reset control cam 86 pivots the cam follower 90 causing the free end 106 of the connecting link 94 to engage the projection 108 and pivot the reset lever 92 to return the lever 24 and the latching pin 16 to a point slightly beyond its reset position. At this point, cam follower 90 has reached a cylindrical dwell portion of ejector cam 86. This cylindrical dwell will hold the above mentioned linkage and latching pin 16 at this slightly overstroked position for a time period of sufficient length to allow for cassette ejection as described hereinafter.

The eject control cam 84 of the timing cam assembly 82 operates an eject mechanism which, as illustrated in FIGS. 1, 2, and 5, comprises a cam follower 116, and a pair of ejector tabs 118 and 120. The cam follower 116 is pivotally secured at one end to a pivot pin 122 (FIG. 2). Intermediate its length, the cam follower 116 carries a follower pin 124 which is normally urged against the surface of the ejector control cam 84 by a tension spring 126 which is connected between the cam follower 116 and a bracket arm 128 (FIG. 2). The free end of the follower arm 116 is shaped to include a generally horizontal slot 130 in which a pin 132 is trapped to form a pin-and-slot connection between the cam follower 116 and one apex of a triangular link 134 as illustrated in FIGS. 2 and 5. The triangular link 134 at a second apex is rigidly secured to, and supported by, one end of a mounting pin 136. The mounting pin 136 is rotatably journaled in the housing 12 and at its opposite end is rigidly secured to the ejector tab 118. The third apex of the triangular link 134 is pivotally secured to one end of a bar link 138 by a pivot pin 139. The opposite end of the bar link 138 is pivotally secured by a pivot pin 141 to the free end of a crank arm 140. The opposite end of the crank arm, in turn, is rigidly secured to, and supported by, one end of a mounting pin 142. At its opposite end, the pivot pin 142 is rotatably journaled in the housing 12 and is rigidly secured to the ejector tab 120. The ejector tabs 118 and 120 are normally in their retracted position with the cam follower 116 in a raised position as depicted in FIG. 2. However, at a predetermined time incident to termination of an operating cycle of the processor/projector unit, the depression 144 in the surface of the ejector cam 84 is positioned to permit the cam follower to be lowered by the tension spring 126 to the position depicted in FIG. 5. As the cam follower 116 is lowered, it effects a rotation of both ejector tabs 118 and 120 upwardly through respective slots 146 and 148 in the housing 12 to engage and lift the cassette 10 in the manner illustrated in FIGS. 4 and 5. As the cassette is lifted, trigger finger 42 is allowed to rise as urged by extension spring 46, thereby returning retaining finger 38 to its upward position behind hind cylindrical shoulder 40 which, as mentioned earlier, is being held at a slightly extended position. Continued rotation of the cam assembly 82 will now reset both above mentioned sets of linkages. More specifically, the eject control cam 84 returns the ejector tabs 118 and 120 from their eject position to their retracted position, and the reset control cam 86 allows its linkages to return to their normal state by means of their associated return springs, 98, 125, 22, respectively.

At this juncture, consideration may be given to the electrical function of the cassette sensing and retaining unit in relation to its mechanical operation. As previously noted, when a cassette 10 is initially inserted into the slot 14 of the housing 12 and firmly pressed against the trigger finger 42, the trigger member 30 pivots retracting its retaining finger 38 from engagement with the latching pin 16. Thus, the latching pin 16 advances under the influence of the spring 22 into latching registration with the latching aperture 18 in the cassette. As the latching pin 16 advances, the lever arm 24 engages the switch assembly 50 closing the switches 52 and 54. Closure of the switch 52 provides AC line power, and closure of the switch 54 provides 12 volt DC supply to the reel drive motor control circuit 150. Complete insertion of the cassette 10 also opens the switch 60. Should the trigger finger 42 have been improperly actuated by an object other than a cassette, the switch 60 would remain closed maintaining a ground return path through the mode change circuit 152 and thereby causing the control system to promptly cycle the control system logic unit 156 through its operating mode logic to return the processor/projector unit to "off" status.

It will be noted by reference to FIG. 6 that insertion of an unprocessed cassette into the processor/projector unit is sensed by the contacts 68 and 70 in that an electrical continuity is established therebetween to complete a ground return path through the programming relay coil 80 thereby engaging the relay coil 80. As described in the aforementioned application of Erwin E. Figge et al, energization of the relay coil 80 effects a closure of relay contacts to program the control system for an unprocessed film operating cycle which includes a development mode. The relay coil 80 is self-latching in its energized state since it effects a closure of relay contacts 154 to complete a ground return path for the relay coil 80 which is in parallel with the sensing contacts 68 and 70. This relay memory will remain latched until the logic contacts 157 are opened by the control system logic unit.

In addition to effecting a closure of relay contacts, the energized programming relay coil 80 also functions as a solenoid to actuate a disabling mechanism to prevent retraction of the latching pin 16 from the cassette 10. Referring to FIG. 1, the relay coil 80 is contained within an enclosure 159 attached to the housing 12. Whenever the relay coil 80 is energized, it functions as a solenoid to raise a disable member 158. The disable member 158 is provided with a pair of horizontal slots 160 in which the loop of reset connecting link 94 is slidably engaged. When the disable member 158 is in its raised of disable position, the reset connecting link 94 loop is lifted above and disengaged from the projection 108 of the reset lever 92 as depicted in phantom view in FIG. 1. With the reset connecting link 94 disengaged from the projection 108, the reset mechanism is disabled in the sense that it is prevented from effecting retraction of the latching pin 16 from the cassette 10 or opening of the switches 52 and 54. Accordingly, while the programming relay coil 80 is energized, the cassette 10 will be retained in the slot 14 even though the reset control cam 86 may have reached an orientation which would otherwise effect a retraction of the latching pin 16 and even though the eject control cam 84 may have reached an orientation which would otherwise effect ejection of the cassette 10. For this connection, it should be noted with reference to FIG. 2 that it is the spring 126 that provides the force to raise the ejector tabs 118 and 120. It is apparent, however, that when the cassette 10 remains latched in position by the latching pin 16, the spring 126 causes the ejector tabs 118 and 120 to bear with force against the bottom of the cassette 10 when the cam depression 144 registers with the cam follower 124 but will not displace the cassette 10. Hence, the sensing and retaining unit of the present invention provides the versatility of enabling reset and ejection of the cassette to be prevented in order to continue operation of the film handling apparatus. In the control system of the processor/projector unit as described in the aforementioned application of Erwin E. Figge et al, this feature is employed in the programmed operating cycle for cassette containing unprocessed film to cause the processor/projector unit to proceed from a "develop"

mode for film drying without ejection or de-energization of the processor/projector unit. Specifically, the control system logic unit 156 (FIG. 6) is arranged to de-energize the programming relay coil 80 by opening contacts 157 just after the reset control cam 86 has reached and passed its reset command rotational orientation. This permits the processor/projector unit to proceed from the "develop" mode to a normal processed-film "project" mode without cassette ejection or de-energization of the processor/projector unit.

During the normal processed-film operating cycle, the relay coil 80 is de-energized since no electrical continuity is sensed across the sensor contacts 68 and 70. Accordingly, at the end of a processed-film operating cycle when the cam shaft 88 brings reset control cam 86 to its reset command orientation and the eject control cam 84 simutaneously to its eject command orientation, the latching pin 16 is retracted, the switches 52 and 54 are opened, and the cassette 10 is displaced upwardly by the ejector tabs 118 and 120 as illustrated in FIGS. 4 and 5, permitting the switch 60 to close and permitting the trigger finger 42 to rise to permit its associated retaining finger 38 to engage and retain the latching pin 16 in retracted position. The cassette 10 may now be manually withdrawn from the slot 14, and the unit is conditioned to receive a new cassette.

It will be appreciated by those skilled in the art that modifications and changes may be made in the foregoing exemplary embodiment of the invention without departing from the scope of the invention. The invention may be modified, for example, to fit the requirements of a particular application of the invention.

What is claimed is:

1. In an electrically energizable film handling apparatus having a control system for controlling plural film handling modes and being adapted to receive a film cassette having a cassette latching aperture therein, a cassette sensing and retaining unit comprising:
    a housing forming a slot for receiving said cassette;
    latching means for engaging said cassette in response to completed insertion of said cassette into said slot for latching said cassette in position in said slot during operation of said film handling apparatus;
    energization switch means for effecting energization of said apparatus incident to said engagement of said cassette by said latching means;
    said latching means comprising:
        an elongate latching pin mounted for co-axial alignment with said cassette latching aperture when said cassette is completely inserted into said slot, said latching pin being longitudinally movable between a latch position engaged in said latching aperture and a retracted position;
        spring loaded means for moving said latching pin from said retracted position to said latch position and for actuating said energization switch means incident to moving said latching pin to said latch position; and
        trigger means for engaging and retaining said latching pin in said retracted position and, responsive to completed insertion of a cassette into said slot, for releasing said latching pin for movement to said latch position; and
    reset and eject means for retracting said latching means from engagement with said cassette, for deactuating said switch means, and for moving said cassette to an eject position incident to termination of operation of said film handling apparatus, said reset and eject means comprising:
        first cam-operated means for moving said latching pin from said latch position to said retracted position against the force of said spring-loaded means thereby de-actuating said switch means and enabling said trigger means to engage and retain said latching pin in said retracted position;
        second cam-operated means for engaging and moving said cassette to said eject position; and
        timing cam means for effecting correlated operation of said first and second cam-operated means incident to termination of operation of said film handling apparatus.

2. In an electrically energizable processor/projector apparatus having a control system for programming and controlling plural operating modes of the apparatus including a projection mode and a development mode and being adapted to receive a film cassette having a cassette latching aperture therein and indicator means thereon to indicate whether such cassette contains undeveloped film or developed film, a cassette sensing and retaining mechanism comprising:
    a housing forming a slot for receiving said cassette;
    latching means for engaging said cassette in response to completed insertion of said cassette into said slot for latching said cassette in position in said slot during operation of said film handling apparatus, said latching means comprising an elongate latching pin mounted for co-axial alignment with said cassette latching aperture when said cassette is completely inserted into said slot, said latching pin being longitudinally movable between a latch position engaged in said latching aperture and a retracted position, spring-loaded means for moving said latching pin from said retracted position to said latch position, and trigger means for engaging and retaining said latching pin in said retracted position and responsive to completed insertion of a cassette into said slot for releasing said latching pin for movement to said latch position;
    reset and eject means for retracting said latching means from engagement with said cassette and for moving said cassette to an eject position incident to termination of operation of said film handling apparatus, said reset and eject means comprising first cam-operated means for moving said latching pin from said latch position to said retracted position against the force of said spring-loaded means thereby enabling said trigger means to engage and retain said latching pin in said retracted position, second cam-operated means for engaging and moving said cassette to said eject position, and timing cam means for effecting correlated operation of said first and second cam-operated means incident to termination of operation of said film handling apparatus;
    disable means actuatable for disabling said reset and eject means; and
    indicator sensing means, responsive to an indication of an undeveloped film by said cassette indicator means, for actuating said disable means to disable said reset and eject means in order to prevent termination of operation of said apparatus following said development mode and to thereby cause said apparatus to proceed to said projection mode.

3. In an electrically energizable processor/projector apparatus having a control system for programming and controlling plural operating modes of the apparatus including a projection mode and a development mode, said apparatus being adapted to receive a film cassette having a cassette latching aperture therein and indicator means thereon to indicate whether its cassette contains undeveloped film or developed film, a cassette sensing and retaining mechanism comprising:

a housing forming a slot for receiving said cassette;

latching means for engaging said cassette in response to completed insertion of said cassette into said slot for latching said cassette in position in said slot during operation of said film handling apparatus;

energization switch means for effecting energization of said apparatus in response to operation of said latching means engaging said cassette;

said latching means comprising:

an elongate latching pin mounted for co-axial alignment with said cassette latching aperture when said cassette is completely inserted into said slot, said latching pin being longitudinally movable between a latch position engaged in said latching aperture and a retracted position;

spring-loaded means for moving said latching pin from said retracted position to said latch position and for actuating said switch means incident to moving said latching pin to said latch position; and trigger means for engaging and retaining said latching pin in said retracted position and responsive to completed insertion of a cassette into said slot to release said latching pin for movement to said latch position;

reset and eject means for retracting said latching means from engagement with said cassette, for deactuating said switch means, and for moving said cassette to an eject position incident to termination of operation of said film handling apparatus, said reset and eject means comprising first cam-operated means for moving said latching pin from said latch position to said retracted position against the force of said spring-loaded means thereby deactuating said switch means and enabling said trigger means to engage and retain said latching pin in said retracted position, second cam-operated means for engaging and moving said cassette to said eject position, and timing cam means for effecting correlated operation of said first and second cam-operated means incident to termination of operation of said film handling apparatus;

disable means actuatable for disabling said reset and eject means; and indicator sensing means, responsive to an indication of an undeveloped film by said cassette indicator means, for actuating said disable means to disable said reset and eject means in order to prevent termination of operation of said apparatus following said development mode and to thereby cause said apparatus to proceed to said projection mode.

4. The invention defined in claim 3 further comprising a normally-closed cassette sensing switch positioned to be opened by completed insertion of a cassette into said slot and connected in circuit with said control system for actuating said control system to cycle said apparatus immediately back to its off condition if said energization switch means are actuated without concurrent opening of said cassette sensing switch.

5. The invention defined in claim 3 wherein said indicator sensing means includes solenoid means for actuating said disable means and circuit means for energizing said solenoid means in response to an indication of an undeveloped film by said cassette indicator.

6. The invention defined in claim 3 wherein said trigger means comprises a pivotally-mounted member having a trigger finger extending into the interior lower region of said slot and a retaining finger adapted to engage a surface of said latching pin for retaining said latching pin in retracted position, said pivotally-mounted member being spring-biased toward a position in which said retaining finger engages said surface of said latching pin, said pivotally-mounted member being pivotally movable against the force of said spring bias in response to depression of said trigger finger upon completed insertion of a cassette into said slot to withdraw said retaining finger from engagement with said latching pin.

7. In an electrically energizable film handling apparatus having a control system including a mode change circuit for controlling plural film handling modes and being adapted to receive a film cassette, a cassette sensing said retaining unit comprising:

a housing forming a slot for receiving said cassette;

latching means, in response to completed insertion of said cassette into said slot, for latching said cassette in an operative position in said slot;

energization switch means connected in said mode change circuit for effecting energization of said apparatus and of said mode change circuit incident to said latching of said cassette by said latching means;

reset and eject means for retracting said latching means from engagement with said cassette, for deactuating said energization switch means, and for moving said cassette to an eject position incident to termination of operation of said film handling apparatus; and a cassette sensing switch, connected in said mode change circuit and positioned to be actuated by completed insertion of a cassette into said slot, for actuating said mode change circuit to immediately cycle said control system more rapidly than normal through its operating mode logic back to an "off" condition if said energization switch means is actuated without concurrent actuation of said cassette sensing switch.

* * * * *